United States Patent
Yajima

(10) Patent No.: US 10,054,962 B2
(45) Date of Patent: Aug. 21, 2018

(54) THERMO VALVE

(71) Applicant: c/o NIPPON THERMOSTAT CO., LTD., Tokyo (JP)

(72) Inventor: Noriyasu Yajima, Tokyo (JP)

(73) Assignee: NIPPON THERMOSTAT CO., LTD., Tokyo (JP)

( * ) Notice: Subject to any disclaimer, the term of this patent is extended or adjusted under 35 U.S.C. 154(b) by 135 days.

(21) Appl. No.: 14/440,358

(22) PCT Filed: Oct. 8, 2013

(86) PCT No.: PCT/JP2013/077363
§ 371 (c)(1),
(2) Date: May 3, 2015

(87) PCT Pub. No.: WO2014/119048
PCT Pub. Date: Aug. 7, 2014

(65) Prior Publication Data
US 2015/0277453 A1    Oct. 1, 2015

(30) Foreign Application Priority Data

Jan. 30, 2013  (JP) .................................. 2013-015978

(51) Int. Cl.
*G05D 23/08* (2006.01)
*F16K 31/00* (2006.01)
(Continued)

(52) U.S. Cl.
CPC ........... *G05D 23/08* (2013.01); *F16K 17/003* (2013.01); *F16K 17/048* (2013.01); *F16K 31/002* (2013.01); *G05D 23/1333* (2013.01)

(58) Field of Classification Search
CPC ..... G05D 23/02; G05D 23/021; G05D 23/275
(Continued)

(56) References Cited

U.S. PATENT DOCUMENTS

| 6,253,837 B1 | 7/2001 | Seiler et al. |
| 8,141,790 B2 * | 3/2012 | Sheppard ................. F01P 7/16 |
| | | 236/100 |
| 2008/0029246 A1 * | 2/2008 | Fratantonio ......... F16H 57/0412 |
| | | 165/103 |

FOREIGN PATENT DOCUMENTS

| EP | 2275891 | 1/2011 |
| JP | S59105659 A | 6/1984 |

(Continued)

OTHER PUBLICATIONS

International Preliminary Report for PCT/JP2013/077363 dated Aug. 4, 2015.
(Continued)

*Primary Examiner* — Keith Raymond
*Assistant Examiner* — Nael Babaa
(74) *Attorney, Agent, or Firm* — Isshiki International Law Office; Joseph P. Farrar, Esq.

(57) ABSTRACT

A thermo valve has a valve chamber disposed inside a housing and open to a first flow path through an opening. Second and third flow paths open into the valve chamber. A thermo-element that can move back and forth axially inside the valve chamber in response to fluid temperature opens and closes the second and third flow paths and is biased in a direction that blocks the flow paths by a coil spring. A valve element that is a bypass valve that opens and closes an opening that connects the first and third flow paths inside the valve chamber and communicates the first and third flow paths is disposed in the opening. The coil spring is also used to bias the valve element in a direction that blocks the flow paths.

3 Claims, 4 Drawing Sheets

(51) Int. Cl.
  *G05D 23/13* (2006.01)
  *F16K 17/00* (2006.01)
  *F16K 17/04* (2006.01)
(58) Field of Classification Search
  USPC ........................................................ 236/34.5
  See application file for complete search history.

(56) References Cited

FOREIGN PATENT DOCUMENTS

| | | |
|---|---|---|
| JP | S6043939 A | 3/1985 |
| JP | H10246355 A | 9/1998 |
| JP | 2007192406 A | 8/2007 |
| JP | 2007-333068 A1 | 12/2007 |
| JP | 2010196670 A | 9/2010 |
| JP | 2011208532 A | 10/2011 |
| JP | 2012225216 A | 11/2012 |
| WO | 2007144746 A2 | 12/2007 |

OTHER PUBLICATIONS

International Search Report for PCT/JP2013/077363 dated Nov. 12, 2013.

\* cited by examiner

THERMO VALVE

TECHNICAL FIELD

The present invention relates to a thermo valve, and more particularly, to a thermo valve equipped with an optimum bypass valve used in fluid flow paths for adjusting the temperature of lubricant and cooling oil of a vehicle transmission using a heat exchanger.

BACKGROUND ART

A variety of different configurations have been proposed for the conventional thermo valve.

For example, a thermo valve used in a cooling device for lubricant and cooling oil in the vehicle transmission is disclosed in Patent Document 1. Briefly, a movable thermo-element is disposed inside a case that constitutes the thermo valve; as the thermo-element moves, it opens and closes a flow path using a flow path closing member that is a main valve attached to the thermo-element.

In the above-described thermo valve, when the oil exceeds a certain temperature, oil flowing out of the vehicle transmission is passed through an oil cooler and returned to the vehicle transmission, and when the oil falls to a certain temperature the oil cooler circuit is bypassed and the flow of oil returned to the vehicle transmission is controlled by the opening and closing of the main valve that is the flow path closing member that controls the flow of oil returned to the vehicle transmission. In the event that that oil that flows directly from the vehicle transmission to the oil cooler achieves a certain pressure, a flow path closing member that is a bypass valve and which is separate from the flow path closing member that is the main valve operates and releases the pressure.

A thermo valve similar to that described above is disclosed in Patent Document 2. That is, in this conventional example, unlike the thermo valve of Patent Document 1 described above, this thermo valve eliminates the flow path closing member that is the main valve and uses the thermo-element itself as the main valve, with the thermo-element biased by a coil spring.

PRIOR ART DOCUMENTS

Patent Documents

Patent Document 1: JP-2007-333068-A
Patent Document 2: U.S. Pat. No. 6,253,837

SUMMARY OF THE INVENTION

Technical Problem

With the conventional structure of Patent Document 1 described above, the overall number of parts is large and therefore it is difficult to make the thermo valve compact. As a result, it has been difficult to meet various past and present demands for smaller, lighter vehicle transmissions.

With the conventional structure of Patent Document 2 described above, although it manages to reduce the number of constituent parts to some extent and make it possible to achieve a somewhat more compact design, separate and dedicated biasing springs are required for the main valve and the bypass valve, there still remain a large number of constituent parts.

Further, because the thermo-element is biased and held by the main valve coil spring the movement of the thermo-element became unstable. Then, with the conventional structure of Patent Document 2, the increase in the number of constituent parts complicated assembly. As a result, there were problems achieving smooth motion and durability. A solution to all these problems has long been sought in the art.

The present invention was conceived in light of the above-described circumstances, and has as its object to provide thermo valve for use in a vehicle transmission cooling device that minimizes the number of constituent parts, simplifies the structure, can be made compact and light-weight, operates smoothly, and moreover has improved durability.

Solving the Technical Problem

To achieve this objective, the present invention (the invention according to claim 1) provides a thermo valve for selectively opening and closing a first flow path and a second flow path inside a valve housing by switching flow paths in response to fluid temperature and fluid pressure, comprising a valve chamber inside the housing, open to the first flow path through an opening; a thermo-element disposed inside the valve chamber so that the second flow path and a third flow path open into the valve chamber, wherein the thermo-element is capable of moving back and forth within the valve chamber in response to fluid temperature so as to open and close the second flow path and the third flow path; a coil spring that biases the thermo-element in a direction that closes off the flow paths; and a valve element disposed in the opening connecting the first flow path and the valve chamber, with the coil spring functioning also as a spring means that biases the valve element in a direction that closes off the flow paths.

The present invention (the invention according to claim 2) provides the thermo valve as claimed in claim 1, wherein the thermo-element is disposed within the valve chamber so as to be capable of moving back and forth within the valve chamber along the axial direction of the valve chamber, and constantly biased by the coil spring in a direction that disconnects the second flow path and the third flow path within the valve chamber, the thermo-element further comprising a piston rod that protrudes axially from the thermo-element in response to a rise in ambient fluid temperature.

The present invention (the invention according to claim 3) provides the thermo valve as claimed in claim 2, wherein the thermo-element is slidably supported within the valve chamber with respect to a valve element that constitutes a bypass valve, a sliding portion of the thermo-element cooperating with the valve element to open and close the third flow path and the first flow path.

The present invention (the invention according to claim 4) provides the thermo valve as claimed in any one of claims 1 through 3, wherein the valve element that constitutes the bypass valve is biased within the valve chamber by the coil spring so as to disconnect the first flow path and the second flow path and which operates in response to a fluid pressure differential between the first flow path and the third flow path to connect the first flow path and the third flow path.

The thermo valve according to the present invention as described above provides a valve chamber that communicates with a first flow path situated inside a valve housing through an opening and provides a valve element that constitutes a bypass valve that opens and closes the opening in response to fluid pressure. A thermo-element is provided at second and third flow paths that open into the valve chamber at two places offset in the axial direction of the valve chamber that opens and closes the second and third flow paths. A coil spring that biases the thermo-element is also used as a spring means to urge the valve element that constitutes the bypass valve. As a result, despite the simple configuration achieved by using the minimum number of constituent parts, the following superior effects are provided:

1. Compared to the conventional structure, there are fewer constituent parts and the number of assembly steps and the cost are reduced, enabling the product itself to be made compact 2. The thermo valve can be made even smaller, thereby enabling the size of the equipment that uses the cooling device adopting this thermo valve to be made compact as well and thus providing greater freedom of layout during installation.

3. The structure is simple, and therefore operation is smooth and durability is also improved.

4. During assembly, the bypass valve, coil spring, and thermo-element are inserted into the housing in that order and sealed with the end cap, making assembly easy.

DETAILED DESCRIPTION OF EMBODIMENTS OF THE INVENTION

Figure 1:
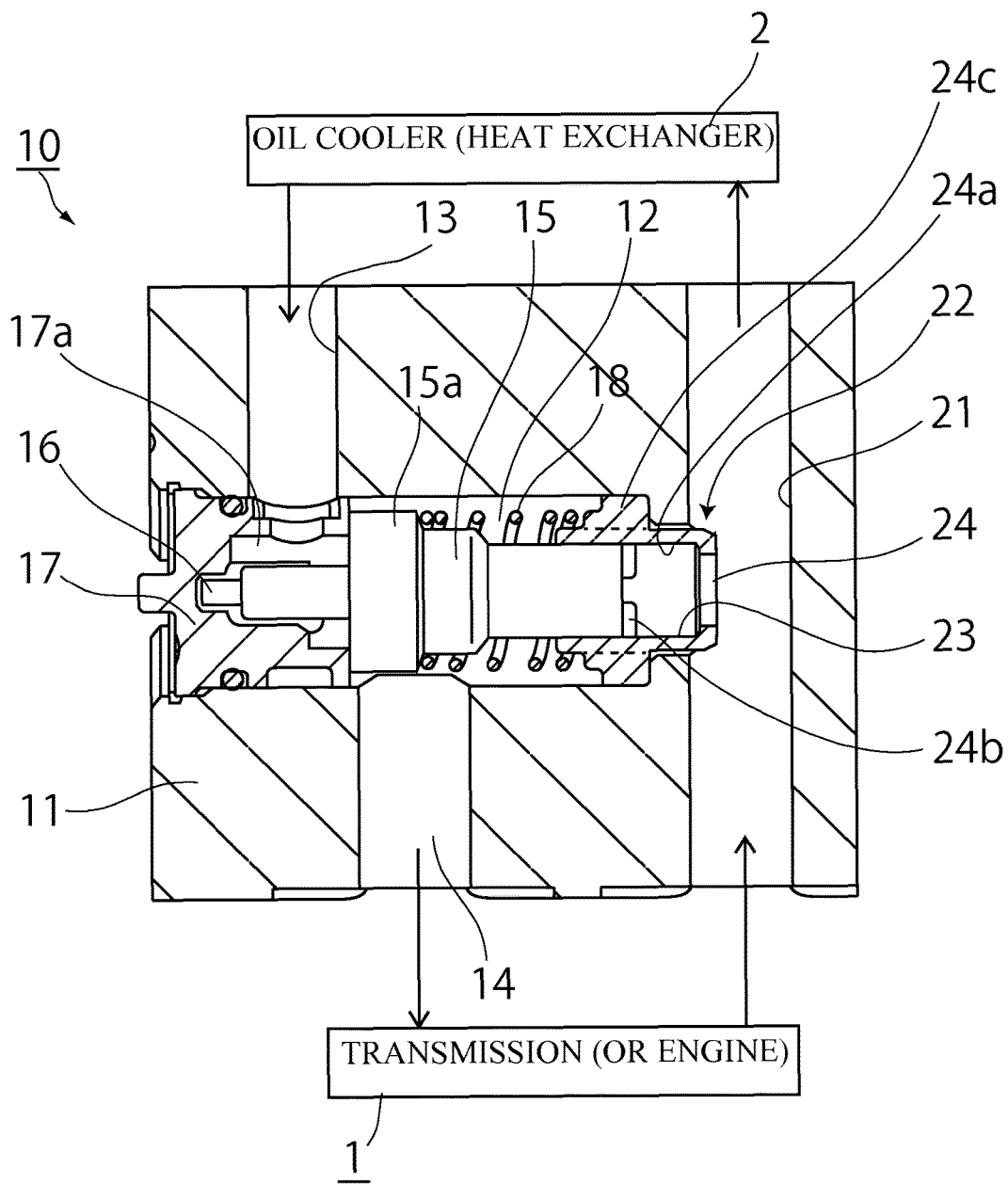
FIG. 1 is a schematic sectional view of an embodiment of a thermo valve according to the present invention.

The thermo valve according to the present invention as described above provides a valve chamber that communicates with a first flow path situated inside a valve housing through an opening and provides a valve element that constitutes the bypass valve that opens and closes the opening in response to fluid pressure. A thermo-element is provided at second and third flow paths that open into the valve chamber at two places offset in the axial direction of the valve chamber that opens and closes the second and third flow paths. A coil spring that biases the thermo-element is also used as a spring means to bias the valve element that constitutes a bypass valve. With this configuration, the thermo valve according to the present invention minimizes the number of constituent parts, simplifies the structure, can be made compact and light-weight, operates smoothly, and moreover has improved durability.

First Embodiment

FIG. 1 through FIG. 4 show an embodiment of a thermo valve according to the present invention.

In these drawings, reference numeral 10 denotes the thermo valve as a whole. The thermo valve 10 is installed on an oil circuit between a vehicle transmission (or engine) 1 and an oil cooler (heat exchanger) 2, in, for example, a cooling device for lubricant or cooling oil of a vehicle transmission.

Figure 2:
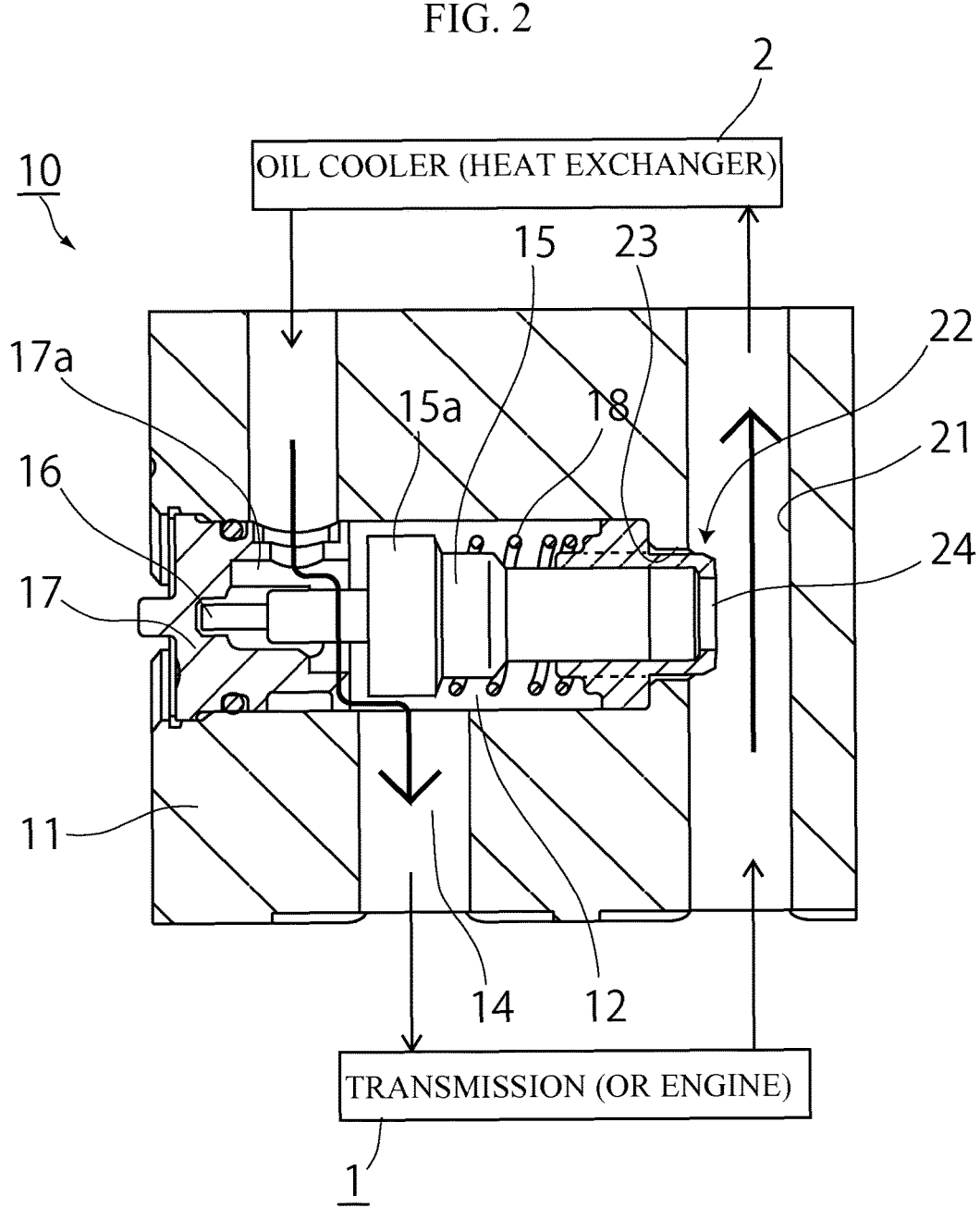
FIG. 2 is a schematic sectional view illustrating an operating state of the thermo valve shown in FIG. 1.
Figure 3:
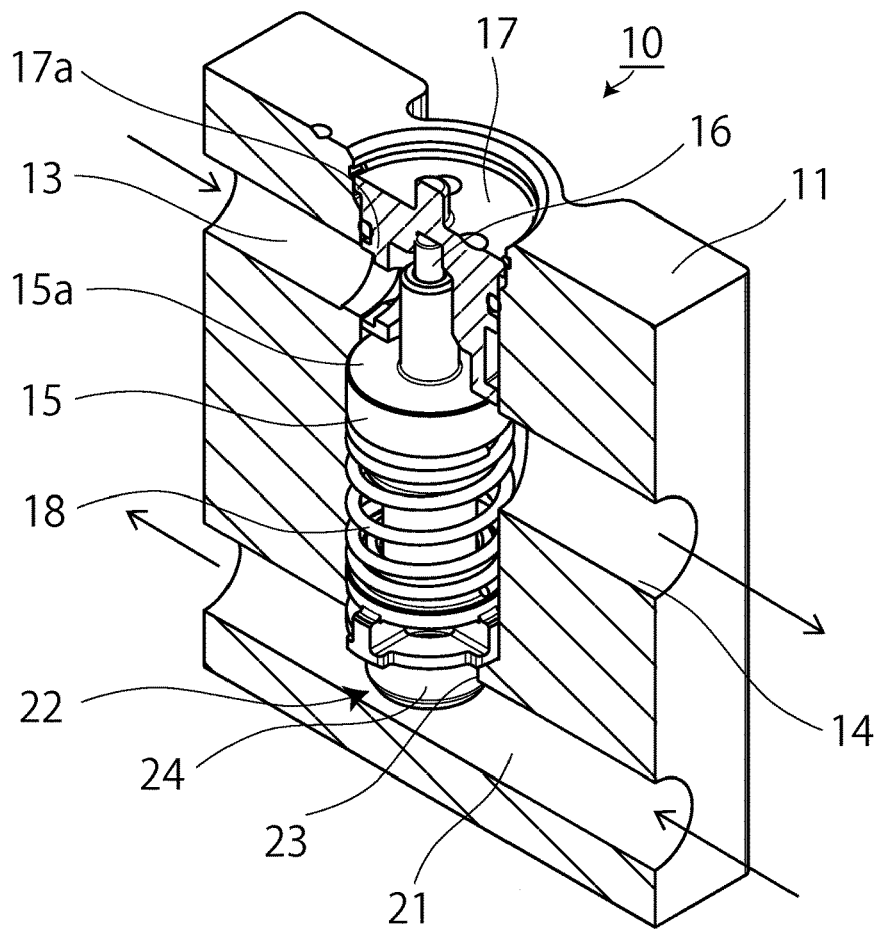
FIG. 3 is a partial perspective view illustrating a portion of the general configuration of the thermo valve shown in FIG. 1 and FIG. 2.

In FIGS. 1 through 3, reference numeral 11 denotes a housing that constitutes the thermo valve, inside of which is formed a first flow path 21 that constitutes a first flow path that sends oil from the vehicle transmission 1 to the oil cooler 2. In addition, a valve chamber 12, one end of which protrudes into the first flow path 21 at the center thereof and the other end of which opens outward and extends in a direction orthogonal to the first flow path 21, is formed in the housing 11 at the center along the axial direction of the first flow path 21.

An opening that constitutes a bypass valve 22 to be described later is formed between the valve chamber 12 and the first flow path 21. A valve element 24 (a secondary valve in relation to the valve element of a thermo-element 15 to be described later, which is the main valve) that opens and closes an opening 23 is provided at one end of the valve chamber 12.

A second flow path 13 that constitutes a second flow path that sends oil from the oil cooler 2 is formed at a portion of the valve chamber 12 toward the outer end thereof, together with a third flow path 14 as a third flow path that sends oil to the vehicle transmission formed so as to open into the valve chamber 12 at a position offset inward from the second flow path 13 along the axial direction of the valve chamber 12.

Reference numeral 15 denotes a spool-shaped thermo-element movably disposed inside the valve chamber 12. The interior of the thermo-element 15 is filled with wax (not shown) that expands and contracts, causing a piston rod 16 disposed within the thermo-element 15 to move back and forth along the axial direction. As the piston rod 16 extends outward it strikes an end cap 17, causing the thermo-element 15 to move inward within the valve chamber 12 toward the inner end of the valve chamber 12 (to the right in the drawing). As a result, via a fluid flow path formed inboard of the end cap 17, as shown in FIG. 2, the second flow path 13 and the third flow path 14 are connected, so that oil from the oil cooler 2 flows to the vehicle transmission 1 side.

It should be noted that reference numeral 15a denotes a portion of increased diameter of the thermo-element 15 that is the main valve that constitutes the thermo valve 10. This portion of increased diameter 15a, by opening and closing the fluid flow path 17a in the end cap 17, alternately opens and closes the flow of oil.

The present invention provides a coil spring 18 that always biases the thermo-element 15 that is the main valve that opens and closes the second and third flow paths 13, 14 in a direction that closes the flow path (to the left in the FIG. 1). The coil spring 18 is also used as a biasing spring means that biases a valve element 24 that constitutes the bypass valve 22 (the second valve in relation to the main valve) in a direction that closes the opening 23.

Within the valve chamber 12, one end of the thermo-element 15 is slidably supported within an axial aperture formed in the valve element 24 that constitutes the bypass valve 22 while at the other end the piston rod 16 protruding therefrom is axially supported within the end cap 17. With such a configuration the thermo-element 15 moves reciprocally back and forth within the valve chamber 12.

As the thermo-element moves reciprocally back and forth within the thermo-element 15 it opens and closes a window 24b formed in the peripheral wall of the flow path aperture 24a inside the valve element 24, thereby configuring a bypass valve 24 fluid flow path at the time the temperature rises.

Figure 5:
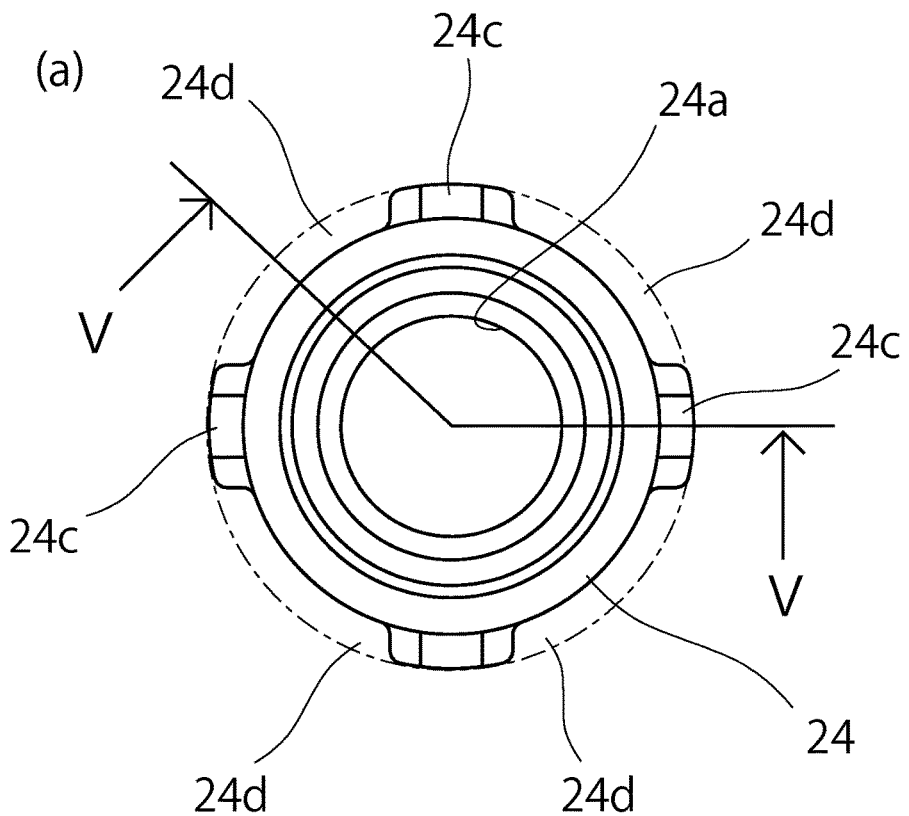
FIGS. 5 (a) and (b) are schematic top and sectional views along line V-V, respectively, of the valve element in the bypass valve shown in FIG. 4.
Figure 5:
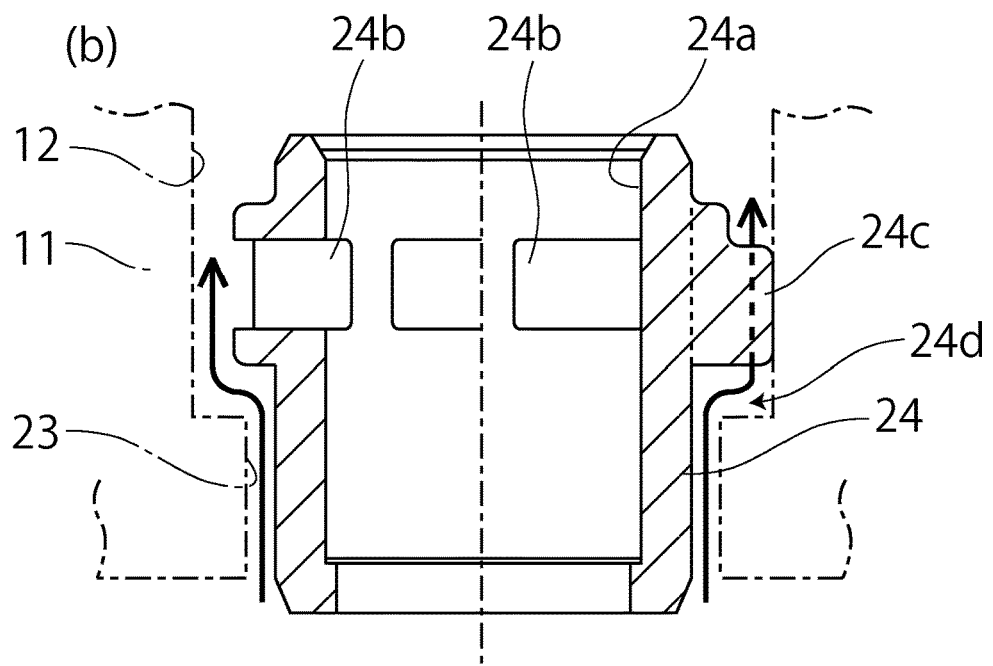

When the bypass valve 22 is closed, and moreover when the window 24b is opened by the thermo-element 15, a pressure differential arises between the valve chamber 12 and the first flow path 21, at which point the valve element 24 slides to the open direction and the first flow path 21 and the valve chamber 12 are communicated via a fluid flow path 24d (see FIGS. 5 (a), (b)) formed between ribs 24c formed around the valve element 24 and the wall of the valve chamber 12.

FIG. 5 shows the valve element 24 that constitutes the bypass valve 22, in which (a) is a schematic side view of the valve element 24 and (b) is a sectional view along a line V-V in (a). The broken lines indicate the valve housing 12 and the opening 23 in the housing 11 shown in FIG. 1 and FIG. 2. In FIG. 5 (b), the valve element 24 that constitutes the bypass valve 22 is shown in a state in which it is open inside the valve chamber 12.

The valve element 24 that constitutes the bypass valve 22 and slidably supports the thermo-element 15 is itself slidably supported inside the valve chamber 12 along the outer circumference thereof including the above-described ribs 24c. Therefore the thermo-element 15, via the bypass valve 22 valve element 24 slidably supported within the valve chamber 12, is slidably supported within the valve chamber 12, and at this sliding portion thereof cooperates with the valve element 24 to alternately open and close the third flow path 14 and the first flow path 21.

In other words, one end of the thermo-element 15 is slidably supported within the flow path aperture 24a of the valve element 24 that constitutes the bypass valve 22. Accordingly, the thermo-element 15 can move back and forth smoothly, thereby improving the durability of the valve as a whole.

Additionally, two bypass flow paths are formed, by the flow path aperture 24a formed on the inside of the valve element 24 of the bypass valve 22 and the fluid flow path 24d formed by the plurality of ribs 24c formed on the outside of the flow path aperture 24a, to control the flow volume at the bypass valve 22. This configuration has the advantage of securing the necessary function as a bypass valve 22 with a simple structure using the minimum necessary number of constituent parts.

Moreover, configuring the shapes of the ribs 24c described above and the flow path 24d as desired enables the bypass valve 22 flow path 24d flow volume to be set as desired, and thus the present configuration is easy to adjust with respect to this point as well.

Further, with the bypass valve 22 described above, the size of the projected cross-sectional area of the valve element 24 as seen from the first flow path 21 makes it possible to design the operating pressure and the flow volume of the fluid flow path 24d after the valve is opened, thereby providing the advantages of design ease together with simplified configuration.

With the configuration described above, the total number of constituent parts of the thermo valve 10 can be held to a minimum, the configuration can be simplified, and the overall size can be reduced as can the cost.

With the thermo valve 10 described above, as the temperature of the fluid inside the valve chamber 12 inside the housing 11 and moreover inside the third flow path 14 that communicates with the valve chamber 12 increases, the wax inside the thermo-element 15 expands, pushing out the piston rod 16, which moves the thermo-element 15 inside the valve chamber 12 and thereby obtains a flow of oil between the second and third flow paths 13, 14, so that oil flows from the transmission 1 to the oil cooler 2. When the temperature of the oil falls below a certain temperature, the flow between the second and third flow paths 13, 14 is closed off.

Although the secondary valve 24 that constitutes the bypass valve 22 formed on the inner end of the valve chamber 12 is always biased by the coil spring 18 to close off the opening 23, the secondary valve 24 operates once the pressure differential between the oil pressure inside the first flow path 21 on the one hand and oil pressure inside the valve chamber 12 and further inside the third flow path 14 that communicates with the valve chamber 12 exceeds a certain threshold to allow oil flow directly from the first flow path 1 to the transmission 1 side.

It should be noted that the present invention is not limited to the structure of the first embodiment described above, and accordingly the shapes and structures of the parts that comprise the thermo valve can be changed and varied as convenient.

For example, in the configuration described above, the housing 11 is basically a block-shaped rectangle overall. However, the present invention is not limited thereto, and alternatively any excess may be eliminated as convenient, so that walls of the housing as a whole may have a reduced thickness.

Figure 4:
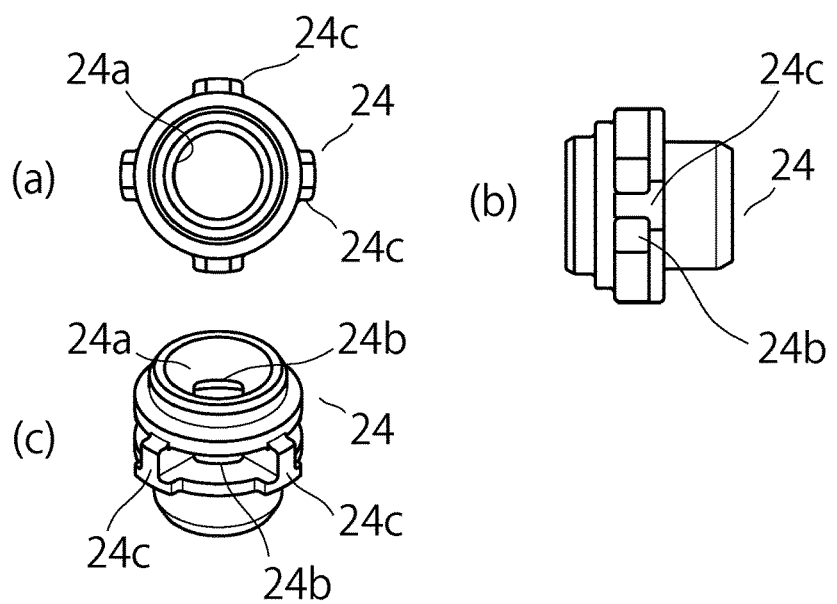
FIGS. 4 (a), (b), and (c) are top, side, and perspective views, respectively, illustrating the general configuration of a valve element in a bypass valve attached to the thermo valve shown in FIG. 3.

Additionally, the shape of the valve element 24 that constitutes the bypass valve 22 is not limited to the shape shown in FIG. 4 and FIG. 5 and may be any convenient shape. In sum, the valve element 24 may be any convenient shape provided that it is biased by the coil spring 18 so that the opening 23 remains closed, and the fluid pressure differential between the valve chamber 12 (which is the same pressure as the third flow path 14) and the first flow path 21 is such that these remain connected, so that it maintains its function as a relief valve.

Moreover, although the embodiment described above the has been described as adapted to the oil cooling device for cooling the vehicle transmission, the present invention is not limited thereto, nor is the fluid limited to oil. In sum, the present invention encompasses anything that is a thermo valve that opens and closes the flow paths in response to the temperature of a fluid and has a structure that also uses a bypass valve that opens and closes the flow paths in response to the fluid pressure.

PARTIAL LIST OF REFERENCE NUMBERS

1 Vehicle transmission (or engine)
2 Oil cooler
10 Thermo valve
11 Housing
12 Valve chamber
13 Second flow path
14 Third flow path
15 Thermo-element (main valve)
16 Piston rod
17 End cap
18 Coil spring
21 First flow path
22 Bypass valve
23 Opening
24 Valve element (secondary valve)

The invention claimed is:
1. A thermo valve for selectively opening and closing a first flow path, a second flow path, and a third flow path inside a valve housing by switching flow paths in response to fluid temperature and fluid pressure, comprising:

a valve chamber inside the valve housing, open to the first flow path through an opening;

a thermo-element disposed inside the valve chamber so that the second flow path and the third flow path open into the valve chamber, wherein the thermo-element is capable of moving back and forth within the valve chamber in response to fluid temperature so as to open and close the second flow path and the third flow path;

a coil spring that biases the thermo-element in a direction that closes off communication between the second flow path and the third flow path, and biases a valve element in a direction that closes off the first flow path from the second flow path and the third flow path via the valve chamber; and a bypass valve constituted as the valve element, disposed in the opening connecting the first flow path and the valve chamber, the thermo-element slidably supported within the valve chamber by the valve element that constitutes the bypass valve, a sliding portion of the thermo-element cooperating with the valve element to open and close communication between the third flow path and the first flow path, a plurality of ribs formed at one end of the valve element, equally spaced around a periphery of the valve element, and protruding radially outward from an intermediate portion of the valve element so as to contact an interior wall of the valve chamber, a plurality of windows formed in the one end of the valve element at a position corresponding to the first flow path, the plurality of windows communicating the first flow path and the valve chamber, the sliding portion of the thermo-element opening and closing the plurality of windows as the thermo-element moves reciprocally back and forth within the valve chamber in response to fluid temperature, wherein, when the bypass valve is closed and a pressure differential arises between the valve chamber and the first flow path as the fluid temperature rises, the valve element slides open against the coil spring to communicate the first flow path and the third flow path via the valve chamber between the plurality of ribs in addition to through the windows.

2. The thermo valve as claimed in claim 1, wherein the thermo-element is disposed within the valve chamber so as to be capable of moving back and forth within the valve chamber along the axial direction of the valve chamber, and constantly biased by the coil spring in a direction that disconnects communication between the second flow path and the third flow path within the valve chamber, the thermo-element further comprising a piston rod that protrudes axially from the thermo-element in response to a rise in ambient fluid temperature.

3. The thermo valve as claimed in claim 1, wherein the valve element that constitutes the bypass valve is constantly biased within the valve chamber by the coil spring so as to disconnect the first flow path and the third flow path, and operates in response to a fluid pressure differential between the first flow path and the third flow path to connect the first flow path and the third flow path to reduce the fluid pressure differential between the first flow path and the third flow path.

\* \* \* \* \*